United States Patent
Gianoglio et al.

(10) Patent No.: US 7,702,445 B2
(45) Date of Patent: *Apr. 20, 2010

(54) CONTROL SYSTEM AND METHOD FOR CONTROLLING THE DRIVING-AWAY MANOEUVRE IN A MOTOR VEHICLE WITH A SERVO-CONTROLLED GEARBOX

(75) Inventors: Renato Gianoglio, Orbassano (IT); Claudia Supparo, legal representative, Turin (IT); Dario Del Pin, Orbassano (IT); Giovanni Ellena, Orbassano (IT); Massimo Fossanetti, Orbassano (IT); Massimo Lupo, Orbassano (IT); Attilio Porta, Orbassano (IT); Pandeli Borodani, Orbassano (IT)

(73) Assignee: C.R.F. Società Consortile per Azioni (IT)

( * ) Notice: Subject to any disclaimer, the term of this patent is extended or adjusted under 35 U.S.C. 154(b) by 937 days.

This patent is subject to a terminal disclaimer.

(21) Appl. No.: 11/449,233

(22) Filed: Jun. 8, 2006

(65) Prior Publication Data
US 2006/0287794 A1 Dec. 21, 2006

(30) Foreign Application Priority Data
Jun. 17, 2005 (EP) .................................. 05425431

(51) Int. Cl.
*B60K 17/00* (2006.01)
(52) U.S. Cl. ............................... 701/67; 701/59; 477/78
(58) Field of Classification Search ........................ None
See application file for complete search history.

(56) References Cited

U.S. PATENT DOCUMENTS 6,389,346 B1  5/2002  Gianoglio et al. ............. 701/51
6,684,145 B1 *  1/2004  Gianoglio et al. ............. 701/54
7,373,233 B2 *  5/2008  Gianoglio et al. ............. 701/51
2007/0005210 A1 *  1/2007  Re Fiorentin ................. 701/54

FOREIGN PATENT DOCUMENTS

DE       103 16 442 A1      10/2003
WO       WO 03/086804 A1    10/2003

OTHER PUBLICATIONS

European Search Report re application No. EP 05425431.3, dated Nov. 16, 2005.

* cited by examiner

*Primary Examiner*—Michael J. Zanelli
(74) *Attorney, Agent, or Firm*—Cook Alex Ltd.

(57) ABSTRACT

What is described is a control system for controlling the driving-away maneuver in a motor vehicle provided with a gearbox comprising a primary input shaft which can be coupled to a drive shaft of a propulsion system of the vehicle by means of a servo-assisted friction clutch, wherein a control unit receives at its input signals indicating a command imparted by the driver of the motor vehicle by operating the accelerator pedal, and generates—on the basis of a mathematical reference model—reference torque request signals indicating the reference torques requested from the drive shaft and from the friction clutch during the driving-away manoeuvre, and also generates—by comparison between signals indicating the estimated angular velocities of the drive shaft and of the primary gear shaft, and detected signals indicating the actual angular velocities of the drive shaft and of the primary gear shaft—corresponding corrective contributions, in such a way as to construct command signals for controlling torque actuator devices of the propulsion system and of the friction clutch, for controlling the driving-away manoeuvre in the motor vehicle.

20 Claims, 4 Drawing Sheets

CONTROL SYSTEM AND METHOD FOR CONTROLLING THE DRIVING-AWAY MANOEUVRE IN A MOTOR VEHICLE WITH A SERVO-CONTROLLED GEARBOX

FIELD OF THE INVENTION

The present invention relates in a general way to the control of the propulsion of a motor vehicle, and more specifically to a control system and method for controlling the driving-away manoeuvre in a motor vehicle provided with a servo-controlled gearbox.

BACKGROUND OF THE INVENTION

In practice, a servo-controlled gearbox is a conventional mechanical gearbox operated by means of servo-controllers, comprising an actuator for disengaging and engaging the friction clutch between the drive shaft and the primary input shaft of the gearbox, an actuator for selecting the transmission ratios and an actuator for engaging the selected transmission ratio.

Servo-controlled gearboxes are well known in the prior art and are used to reproduce and optimize the driver's gear change commands.

The control strategies of a control system for a servo-controlled gearbox must adapt themselves to the operating conditions of the vehicle and must maintain the driving sensation requested by the driver by means of the commands imparted to the accelerator pedal.

A control system for a servo-controlled gearbox is known from U.S. Pat. No. 6,389,346 held by the present applicant. The system comprises an electronic control unit connected to a plurality of sensors for detecting the operating conditions of the vehicle, including a potentiometric sensor for detecting the position of the accelerator pedal, to the actuators of the gearbox, and to the actuators controlling the power delivered by the vehicle's propulsion system, in order to permit the integrated control of the propulsion system and the gearbox during a gear change operation.

The detection of the position of the accelerator pedal enables the driver's intentions to be correctly recognized.

The operation of the control unit is based on a reference model in which the actuator command signals are determined by means of a mathematical model of the driving behaviour, which is designed to adapt the behaviour of the vehicle in terms of comfort and performance, in the various stages of the gear change, according to the commands imparted by the driver by means of the accelerator pedal and a command lever or push button for selecting the transmission ratio, in other words for requesting a change to a higher or lower ratio.

The control system for the servo-controlled gearbox must be configured to control the automatic driving away (starting from stationary) of the vehicle, particularly in accordance with the performance level which is specified by the driver by means of his pressure on the accelerator pedal.

SUMMARY OF THE INVENTION

The object of the present invention is to provide a control procedure for a servo-controlled gearbox, making it possible to obtain, during a driving-away manoeuvre, the functions and performance expected by the driver in accordance with the command imparted by means of the accelerator pedal.

The definition of a servo-controlled gearbox used in the remainder of the present description refers both to a gearbox of the type defined initially and to a configuration which does not provide for the servo-assisted actuation of the selection of the transmission ratios and of the engagement of the selected ratio, which can instead be controlled manually by the driver, but only for the servo-assisted actuation of the clutch control by means of electrical or electro-hydraulic actuators.

According to the present invention, this object is achieved by means of a control system and method having the characteristics claimed in claims 1 and 12, respectively.

BRIEF DESCRIPTION OF THE DRAWINGS

Further advantages and characteristics of the invention will be made clear by the following detailed description, which refers to the attached drawings provided purely by way of example and without restrictive intent, in which.

DETAILED DESCRIPTION OF A PREFERRED EMBODIMENT

Figure 1:
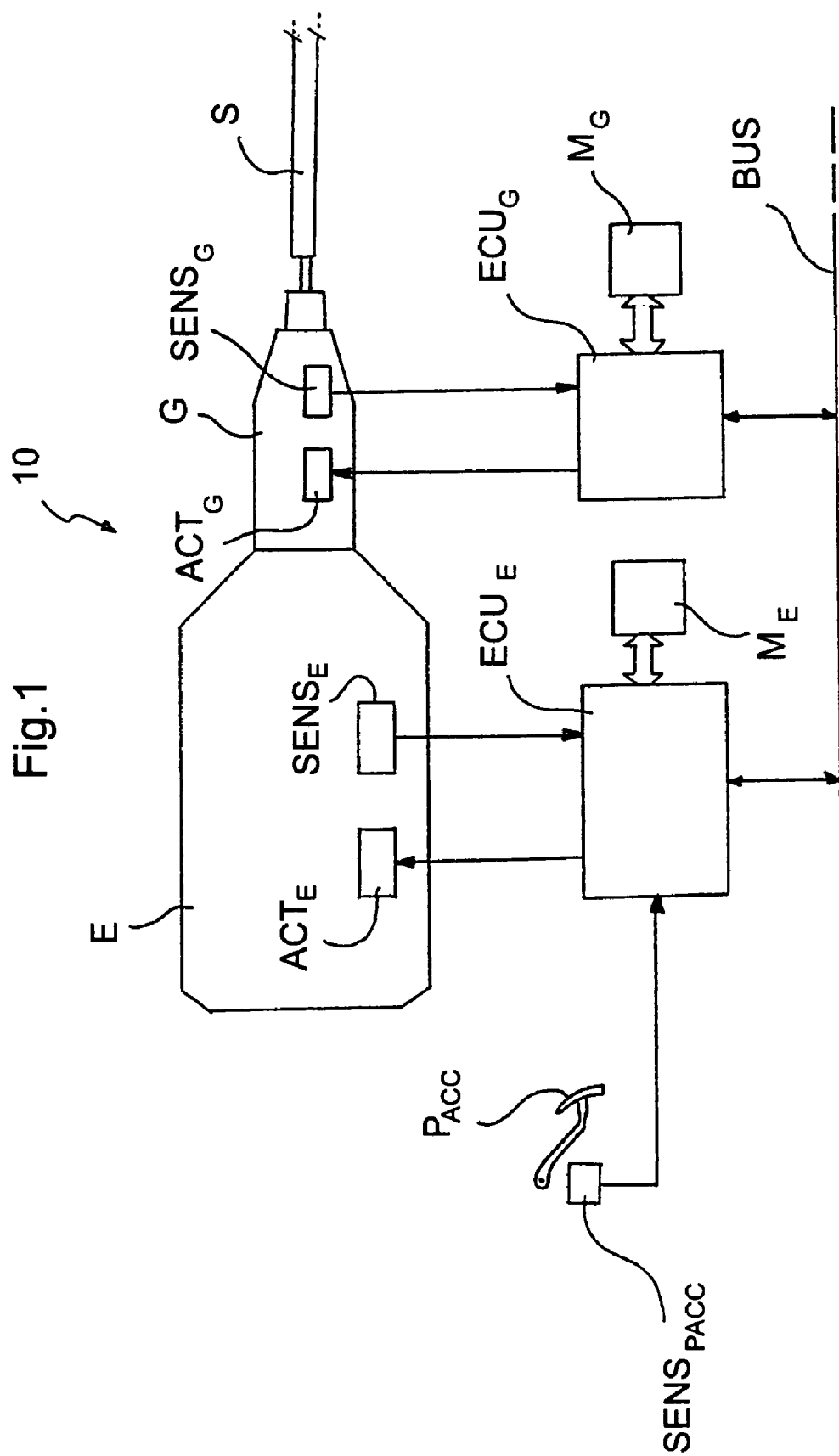
FIG. 1 is a schematic representation of an engine and transmission assembly of a vehicle, including a servo-controlled gearbox associated with a propulsion system.

To make matters clearer, FIG. 1 shows an engine and transmission assembly 10 of a motor vehicle, comprising a propulsion system such as an internal combustion thermal engine E which can transmit the mechanical energy developed to the driving wheels of the vehicle through a gearbox G, a transmission shaft S (partially illustrated in the figure) and a differential (not shown).

The thermal engine is associated with a first electronic processing and control unit $ECU_E$ which can be interfaced with sensor devices associated with the engine and engine actuator devices, indicated in their entirety by $SENS_E$ and $ACT_E$ respectively.

The gearbox G is associated with a second electronic processing and control unit $ECU_G$, which can be interfaced with sensor devices associated with the gearbox and actuator devices for the gearbox, indicated in their entirety by $SENS_G$ and $ACT_G$ respectively.

The two control units $ECU_E$ and $ECU_G$ are coupled to corresponding memory devices $M_E$ and $M_G$, and are connected to a common transmission line BUS, for example a line of a communication network according to the CAN protocol.

In an alternative embodiment, the units $ECU_E$ and $ECU_G$ can be integrated into a single processing unit in order to improve the overall performance of the system.

FIG. 1 also shows the connection of a sensor $SENS_{PACC}$ for detecting the position of the accelerator pedal $P_{ACC}$ at the input to the engine control unit $ECU_E$.

Figure 2:
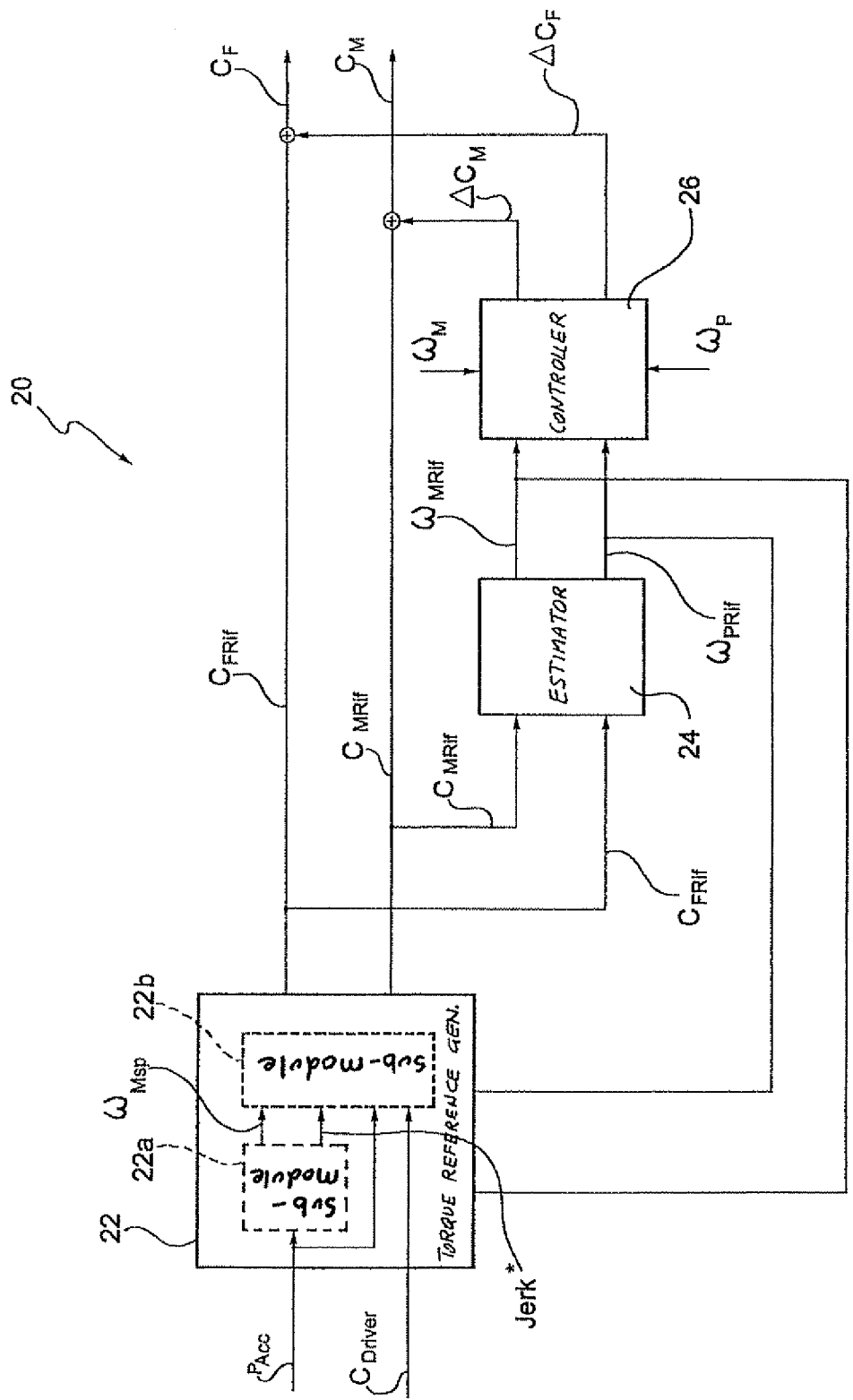
FIG. 2 is a block diagram of the system for controlling the servo-controlled gearbox proposed by the invention.

FIG. 2 shows in detail the logical diagram of a control system for the servo-controlled gearbox G, indicated as a whole by 20, the system being implemented preferably in the gearbox control unit $ECU_G$, but being distributed between the separate units $ECU_E$ and $ECU_G$ if required.

The system 20 comprises a torque reference generator module 22 arranged for calculating the variation in time of a reference torque $C_{MRif}$ requested from the thermal engine and of a reference torque $C_{FRif}$ transmittable by the friction clutch, on the basis of a command imparted by the driver by the operation of the accelerator pedal $P_{ACC}$ to actuate a driving-away manoeuvre. The variation with time of $C_{MRif}$ e $C_{FRif}$ is calculated on the basis of a reference model as a function of intermediate parameters such as the variation in longitudinal acceleration of the vehicle (jerk), the driving-away torque $C_{Driver}$ and the angular velocity of the drive shaft (revolutions of the engine) on driving away $\omega_{Msp}$, obtained from the information on the position of the accelerator pedal.

The signals indicating the position of the accelerator pedal and the driving-away torque $C_{Driver}$ are communicated to the gearbox control unit $ECU_G$ by the engine control unit $ECU_E$ via the transmission line BUS of the CAN network.

The signal indicating the requested driving-away torque $C_{Driver}$ is calculated in the engine control unit $ECU_E$, by means of a reference model stored in the associated memory $M_E$, while the signals indicating the requested jerk and engine revolutions on driving away are calculated in the gearbox control unit $ECU_G$, by means of reference models stored in the associated memory $M_G$.

The torque reference generator module sends from its output a pair of reference torque request signals or data, indicating the reference torque $C_{MRif}$ requested from the thermal engine and the transmittable torque $C_{FRif}$ transmittable by the friction clutch.

These signals are supplied to the input of an engine speed estimator module 24, adapted to calculate the reference angular velocities of the drive shaft and of the primary gear shaft, indicated below by $\omega_{MRif}$ and $\omega_{PRif}$ respectively, on the basis of the information on the temporal variation of the torques $C_{MRif}$ and $C_{FRif}$, according to a simplified transmission model which is mentioned briefly below.

The signals $\omega MRif$ and $\omega_{PRif}$ are then supplied by feedback to the generator module 22 and to the input of a controller module 26 adapted to calculate the error between the reference angular velocities calculated by the estimator module 24 and the actual angular velocities measured by sensors installed on board the vehicle and acquired at the engine control unit and the gearbox control unit.

More specifically, the signal indicating the actual angular velocity of the drive shaft $\omega_M$ is acquired at the input of the engine control unit $ECU_E$ by means of the sensor indicated as $SENS_E$ in FIG. 1, and communicated to the gearbox control unit $ECU_G$ via the line BUS, while the signal indicating the actual angular velocity of the primary gear shaft $\omega_P$ is acquired directly by the unit $ECU_G$ by means of the sensor indicated by $SENS_G$ in FIG. 1.

The estimator module 24 and the controller module 26, in series, form a closed loop compensator.

On the basis of the comparison between the reference angular velocities and the actual velocities, the controller module 26 determines corrective torque contributions $\Delta C_M$ and $\Delta C_F$ and sends corresponding signals or data which are added to the open-loop reference torque request signals or data $C_{FRif}$ and $C_{MRif}$ originated by the module 22 in order to generate corresponding torque request signals $C_M$ and $C_F$.

The signals $C_M$ and $C_F$ are supplied through the engine and gearbox control units to the actuators $ACT_E$ and $ACT_G$, which are, respectively, the engine control actuator and the friction clutch operation actuator. More specifically, the signal $C_M$ is supplied by the gearbox control unit $ECU_G$ to the engine control unit $ECU_E$ via the line BUS, while the signal $C_F$ is used by the gearbox control unit $ECU_G$ for controlling the actuator $ACT_G$ which operates the friction clutch.

Figure 3:
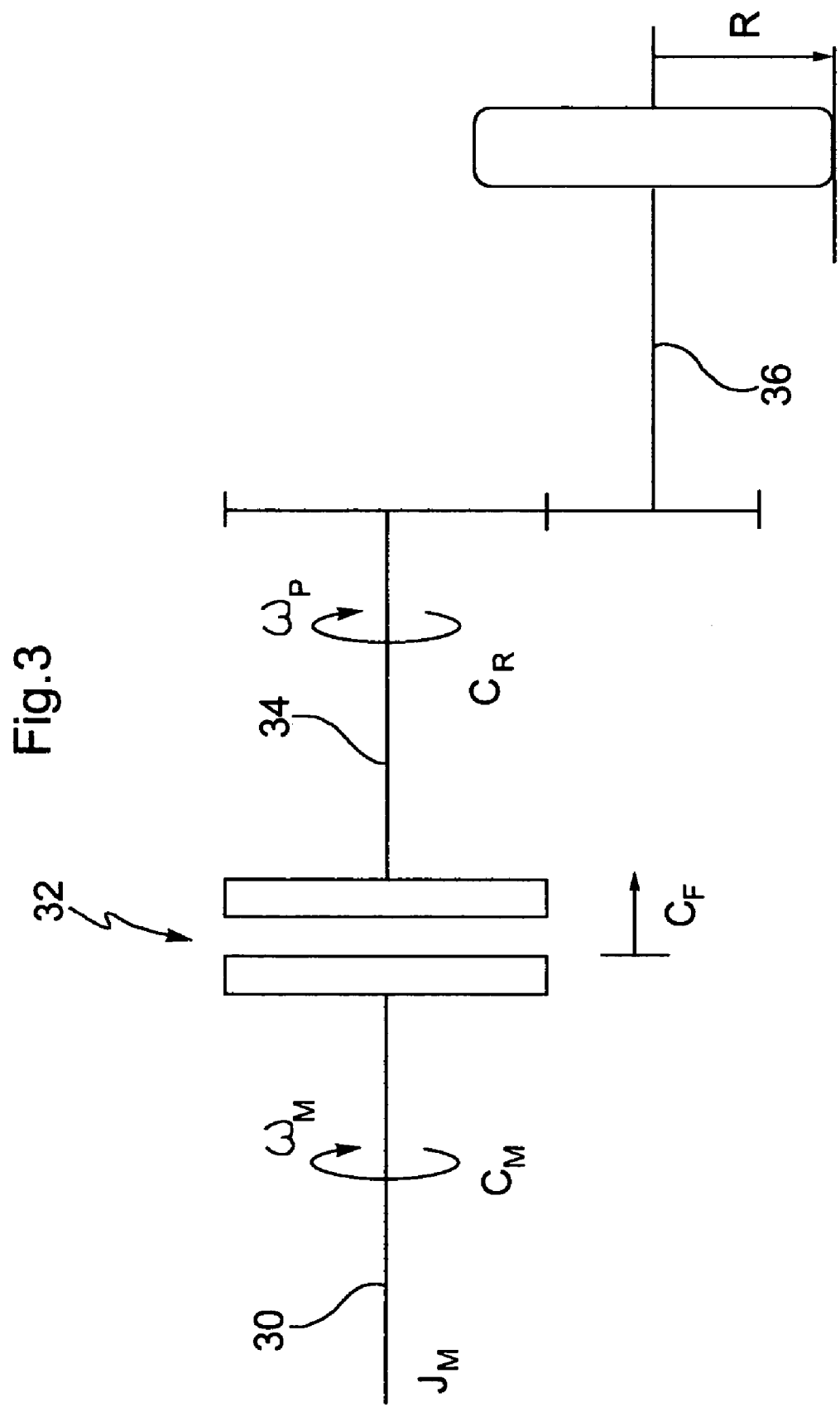
FIG. 3 is a simplified model of the motion transmission used by the control system of FIG. 2.

For the calculation of the reference torques and angular velocities and for the closed loop compensation, use is made of a linear model of the transmission in which the thermal engine and the gearbox clutch are considered to be torque actuators, and no allowance is made for resilient elements (such as flexible couplings) and frictional phenomena between the mechanical members. The model and the corresponding variables and parameters are represented in FIG. 3.

The drive shaft is indicated by 30 and an overall moment of inertia of the engine $J_M$ relates to it. $\omega_M$ and $C_M$ indicate, respectively, the angular velocity of the drive shaft and the net engine torque on the shaft.

Numeral 32 indicates the coupling clutch between the drive shaft 30 and the gearbox, the latter comprising a primary input shaft 34 and a secondary shaft 36 coupled to the differential and, by means of the latter, to the driving wheels.

$C_F$ indicates the torque transmitted by the clutch, which can be modulated as a function of the degree of engagement and sliding of the clutch. $\omega_P$ indicates the angular velocity of the primary shaft. This shaft, together with the secondary shaft and the devices located downstream of the gears, presents a total resistant torque $C_R$ to the clutch.

The system represented by the model of FIG. 3 is described by the following equations.

In the engaged clutch condition:

$$C_M(t) - C_R(t) = (J_M + J_P) \cdot \frac{d\omega_M}{dt} \tag{1}$$

in the disengaged clutch condition, with modulation:

$$C_M(t) - C_F(t) = J_M \cdot \frac{d\omega_M}{dt} \tag{2}$$

on the engine side, and $$C_F(t) - C_R(t) = J_P \cdot \frac{d\omega_P}{dt} \tag{3}$$

on the gearbox side, where $J_P$ indicates the total moment of inertia found on the primary shaft, which depends on the moment of inertia of the driven disc of the clutch $J_{DC}$, on the moment of inertia of the primary shaft of the gearbox $J_{PS}$, and on the total moment of inertia of the vehicle, found at the output of the differential $J_V$ using a constant of proportionality as a function of the selected transmission ratio $\tau$, according to the equation $$J_P = J_{DC} + J_{PS} + \frac{J_V}{\tau^2} \tag{4}$$

The total moment of inertia of the vehicle found at the output of the differential can be calculated according to the equation $$J_V = M \cdot R^2 + 4 \cdot J_W \tag{5}$$

or in other words as a function of the moment of inertia of the wheels $J_W$ and of the mass of the vehicle M and the rolling radius of the wheels R.

The variation (derivative) of longitudinal acceleration, known as the "jerk", is particularly important in relation to driving comfort, and is defined by the equation $$\text{jerk} = \frac{da_x}{dt} \quad (6)$$

During the driving-away manoeuvre, the longitudinal acceleration of the vehicle is related to the acceleration of the primary gear shaft by the relation $$a_x = \frac{d\omega_w}{dt} \cdot R = \frac{d\omega_P}{dt} \cdot \frac{R}{\tau} \quad (7)$$

The variation of the rotation speed of the primary gear shaft depends on the torque transmitted by the clutch according to equation (3) of the transmission model described above; in other words, $$\frac{d\omega_P}{dt} = \frac{C_F(t) - C_R(t)}{J_P} \quad (8)$$

The acceleration of the vehicle during driving away is therefore as follows:

$$a_x = \frac{d\omega_P}{dt} \cdot \frac{R}{\tau} = \frac{C_F(t) - C_R(t)}{J_P} \cdot \frac{R}{\tau} \quad (9)$$

and the jerk can therefore be determined as a function of the clutch torque, assuming that the resistant torque $C_R(t)$ is constant, according to the following formula:

$$\text{jerk} = \frac{da_x}{dt} = \frac{dC_F(t)}{dt} \cdot \frac{R}{J_P \cdot \tau} \quad (10)$$

Consequently, the specification of a constant jerk value, referred to below as jerk*, which is an essential condition and fundamental to the control system proposed by the invention, produces a linear variation of the torque transmitted by the clutch $C_F(t)$, as represented in the upper graph of FIG. 4 in the period $t_0 < t < t_2$.

The following equivalence will therefore be considered:

$$\frac{dC_F(t)}{dt} = \frac{C_F(t_2) - C_F(t_0)}{T_F} = dC_F \quad (11)$$

Given relation (10) and the above equivalence, we obtain $$\text{jerk}^* = \frac{da_x}{dt} = \frac{C_F(t_2) - C_F(t_0)}{T_F} \cdot \frac{R}{J_P \cdot \tau} \quad (12)$$

from which it is possible to calculate the total duration $T_F$ of the interval required to modulate the engagement of the clutch from an initial transmitted torque $C_F(t_0)$ to the final transmitted torque $C_F(t_2)$:

$$T_F = \frac{(C_F(t_2) - C_F(t_0)) \cdot R}{\text{jerk}^* \cdot J_P \cdot \tau} \quad (13)$$

In conclusion, the simplified model which has been adopted establishes that, in order to specify a constant jerk during a driving-away manoeuvre, it is simply necessary to control a ramp of torque transmittable by the clutch, according to the relation $$\frac{dC_F(t)}{dt} = \frac{J_P \cdot \tau}{R} \cdot \text{jerk}^* \quad (14)$$

The variation of the torque transmittable by the clutch is therefore a function of the constant reference jerk value and of the initial value of the torque transmitted by the clutch at the instant $t_0$, and can be summarized in the following equations:

$$C_F(t) = C_F(t_0) + \int_{t_0}^{t} \frac{\text{jerk}^* \cdot J_p \cdot \tau}{R} dt \quad \text{for } t_0 \leq t \leq t_2 \quad (15)$$

$$C_F(t) = C_F(t_2) \quad \text{for } t > t_2.$$

Starting from the value of jerk desired during the driving-away manoeuvre, in order to complete the manoeuvre by reaching a desired angular velocity of the drive shaft on driving away (which can also be deduced from the information on the pressure on the accelerator pedal by the driver), it is necessary to specify the temporal variation of the torque supplied by the engine.

Figure 4:
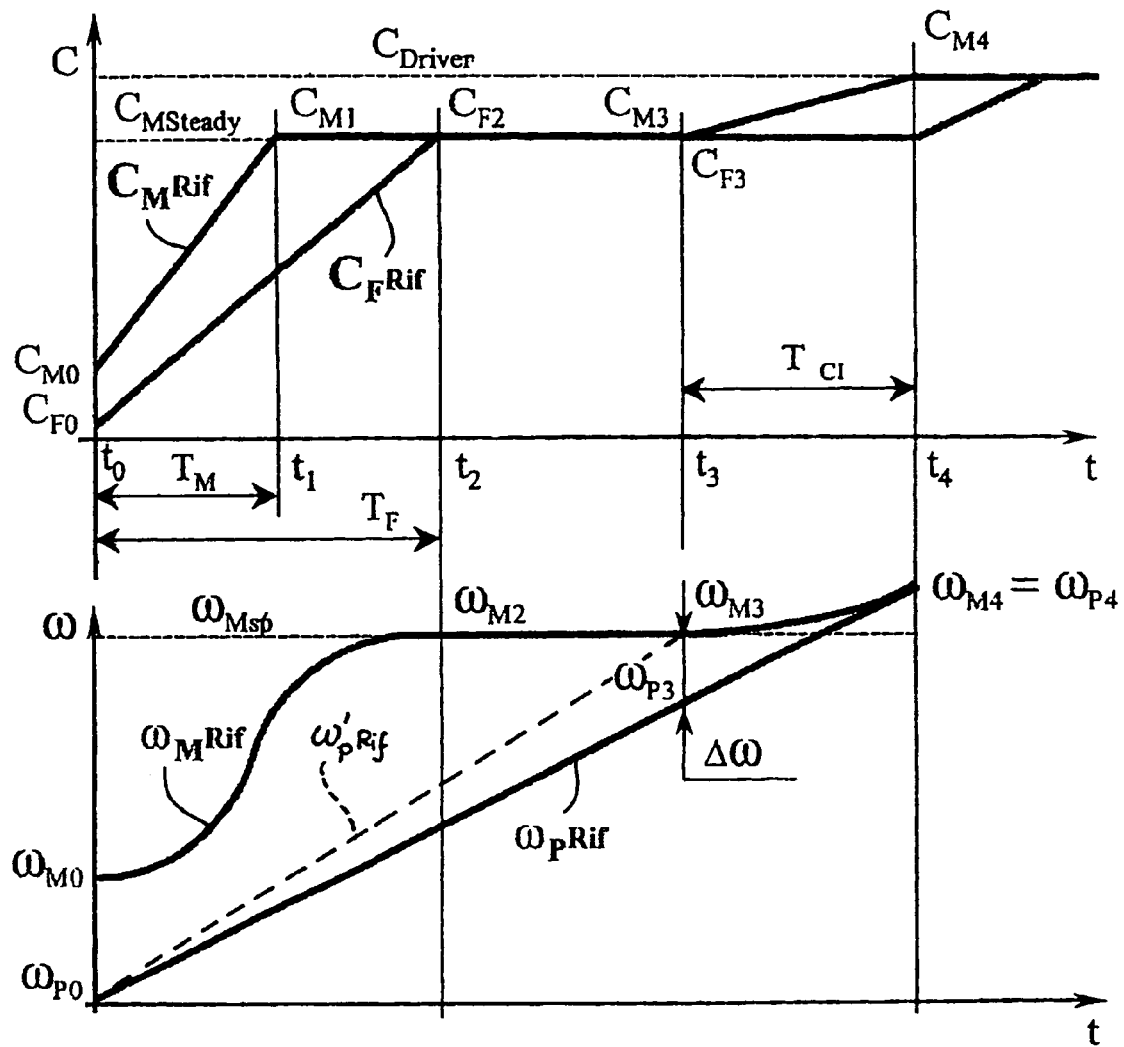
FIG. 4 shows a pair of time diagrams which illustrate the variation of the variables controlled by the system.

In the simplified model which has been adopted, the temporal variation of the engine torque is assumed to depend on the specified clutch torque (and therefore, indirectly, on the requested jerk) and on the requested angular velocity of the drive shaft on driving away, as represented in the upper graph of FIG. 4.

By integrating equation (2) between the instant $t_0$ and the instant $t_2$, we obtain the derivative of the reference torque command for the engine:

$$\int_{t_0}^{t_2} \frac{d\omega_M}{dt} \cdot J_M \cdot dt = \int_{t_0}^{t_2} (C_M(t) - C_F(t)) \cdot dt \quad \text{for } t_0 < t < t_2 \quad (16)$$

Considering that $$C_M(t_1) = C_M(t_2) \quad (17)$$

and resolving the integral, we obtain $$(\omega_M(t_2) - \omega_M(t_0)) \cdot J_M = (C_M(t_2) - C_M(t_0)) \cdot \frac{T_M}{2} + C_M(t_0) \cdot T_M + \quad (18)$$

$$C_M(t_2) \cdot (T_F - T_M) - (C_F(t_2) - C_F(t_0)) \cdot \frac{T_F}{2} - C_F(t_0) \cdot T_F$$

We shall simplify the notation as follows:

$$\begin{cases} C_M(t_0) = C_{M0} \\ C_M(t_2) = C_{M2} \end{cases} \begin{cases} \omega_M(t_0) = \omega_{M0} \\ \omega_M(t_2) = \omega_{M2} \end{cases} \begin{cases} C_F(t_0) = C_{F0} \\ C_F(t_2) = C_{F2} \end{cases} \quad (19)$$

so that the relation (18) becomes:

$$(\omega_{M2} - \omega_{M0}) \cdot J_M = -(C_{M2} - C_{M0}) \cdot \frac{T_M}{2} + (2 \cdot C_{M2} - C_{F2} - C_{F0}) \cdot \frac{T_F}{2} \quad (20)$$

Introducing the condition $$C_M(t_2) = C_F(t_2) \quad (21)$$

into the model, equation (20) can be simplified as:

$$(\omega_{M2} - \omega_{M0}) \cdot J_M = -(C_{M2} - C_{M0}) \cdot \frac{T_M}{2} + (C_{F2} - C_{F0}) \cdot \frac{T_F}{2} \quad (22)$$

Specifying a linear change in the temporal variation of the engine torque, defined as $$\frac{dC_M(t)}{dt} = \frac{C_M(t_1) - C_M(t_0)}{T_M} = \frac{C_M(t_2) - C_M(t_0)}{T_M} = dC_M \quad (23)$$

we can obtain from relation (22) the complete relation which relates the derivative of the engine torque to the derivative of the clutch torque and to the angular velocity of the drive shaft.

$$(\omega_{M2} - \omega_{M0}) \cdot J_M = \frac{(C_{M2} - C_{M0})^2}{2 \cdot dC_M} + \frac{(C_{F2} - C_{F0})^2}{2 \cdot dC_F} \quad (24)$$

By specifying the value of angular velocity of the drive shaft that it is desirable to reach while driving away, it is possible to calculate the derivative of the engine torque required to obtain this:

$$dC_M = \frac{(C_{M2} - C_{M0})^2}{\frac{(C_{F2} - C_{F0})^2}{dC_F} - 2 \cdot (\omega_{M2} - \omega_{M0}) \cdot J_M} \quad (25)$$

For the particular case in which the initial and final values of the clutch and engine torque coincide with each other, we find:

$$dC_M = \frac{1}{\left(\frac{1}{dC_F} - \frac{2 \cdot (\omega_{M2} - \omega_{M0}) \cdot J_M}{(C_{M2} - C_{M0})^2}\right)} \quad (26)$$

In conclusion, the variation of the torque requested from the engine is therefore a function of the reference angular velocity of the drive shaft while driving away and of the variation of the torque transmitted by the clutch, and can be indicated as:

$$C_M(t) = C_M(t_0) + \int_{t_0}^{t} dC_M \, dt \quad \text{for } t_0 \le t \le t_1 \quad (27)$$
$$C_M(t) = C_M(t_1) \quad \text{for } t > t_1$$

When the clutch is engaged, the system changes its operating mode, moving from modulated operation with the clutch disengaged, governed by equation (3), to operation with the clutch engaged, governed by equation (1). In this instant, the inertias as seen from the engine change, and the adopted model must be capable of compensating for this variation of inertia.

It is assumed that the angular velocities of the drive shaft and of the primary shaft of the gearbox are synchronized at the instant $t_3$ (hypothetical curve of the reference angular velocity of the primary shaft $\omega'_{PRif}$ shown in broken lines). If the values of the engine and clutch torques are known prior to the instant $t_3$, the rotation speeds of the drive shaft and the primary gear shaft can be synchronized according to the relation $$\omega_P(t_3) = \omega_M(t_3) \quad (28)$$

The variation of inertia as seen from the engine generates a variation of acceleration which can be calculated considering the acceleration at the instant $t_{3-}$ which precedes the synchronization and at the following instant $t_{3+}$.

At the instant $t=t_{3-}$, the clutch is disengaged, and therefore relation (3) is still true; from this we can find the acceleration according to relation (9):

$$a_x(t_{3-}) = \frac{d\omega_P}{dt} \cdot \frac{R}{\tau}\bigg|_{t_{3-}} = \frac{C_F(t_{3-}) - C_R(t_{3-})}{J_P} \cdot \frac{R}{\tau}. \quad (29)$$

At the instant $t=t_{3+}$, the clutch is engaged, and therefore relation (1) is true and consequently the acceleration is as follows:

$$a_x(t_{3+}) = \frac{d\omega_M}{dt} \cdot \frac{R}{\tau}\bigg|_{t_{3+}} = \frac{C_M(t_{3+}) - C_R(t_{3-})}{J_M + J_P} \cdot \frac{R}{\tau}. \quad (30)$$

The variation of acceleration between the instant $t_{3-}$ and the instant $t_{3+}$ can therefore be calculated as $$\Delta a_x = a_x(t_{3+}) - a_x(t_{3-}) \quad (31)$$

and given that $$\begin{cases} C_M(t_{3-}) = C_M(t_{3+}) = C_{M3} \\ C_F(t_{3-}) = C_F(t_{3+}) = C_{F3} \\ C_R(t) = C_R = c \end{cases} \quad (32)$$

we find that $$\Delta a_x = \left[\frac{C_{M3} - C_R}{J_M + J_P} - \frac{C_{F3} - C_R}{J_P}\right] \cdot \frac{R}{\tau} \quad (33)$$

$$\Delta a_x = \left[\frac{C_{M3}}{J_M + J_P} - \frac{C_{F3}}{J_P} + C_R \cdot \left(\frac{1}{J_P} - \frac{1}{J_M + J_P}\right)\right] \cdot \frac{R}{\tau} \quad (34)$$

Since $C_{M3}=C_{F3}$ at the instant of synchronization, and assuming for simplicity that the resistant torque is zero ($C_R=0$), a negative variation of acceleration would be found:

$$\Delta a_x = \left[\frac{1}{J_M + J_P} - \frac{1}{J_P}\right] \cdot \frac{R}{\tau} \cdot C_{M3} \quad (35)$$

$$\Delta a_x = -\frac{J_M}{(J_M + J_P) \cdot J_P} \cdot \frac{R}{\tau} \cdot C_{M3}. \quad (36)$$

In order to enable the driving-away control system to compensate for the equivalent variation of inertia and the correlated discontinuities in the acceleration of the vehicle due to the engagement of the friction clutch, the reference torques as shown in the graph of FIG. 4 are considered, and both the synchronization between the angular velocities of the drive shaft and of the primary gear shaft and the cancellation of the derivative difference between $\omega_M$ e $\omega_P$ are imposed at the instant $t_4$.

In mathematical terms, the aforesaid condition is expressed by the following equation:

$$\left.\frac{d\omega_M}{dt}\right|_{t_4} = \left.\frac{d\omega_P}{dt}\right|_{t_4} \quad (37)$$

According to equations (1) and (3), reproduced here for ease of reference:

$$\begin{cases} C_M(t) - C_R(t) = (J_M + J_P) \cdot \dfrac{d\omega_M}{dt} \\ C_F(t) - C_R = J_P \cdot \dfrac{d\omega_P}{dt} \end{cases} \quad (38)$$

and with the introduction of the condition (37), we obtain:

$$\begin{cases} \dfrac{C_M(t_4) - C_R(t_4)}{J_M + J_P} = \left.\dfrac{d\omega_M}{dt}\right|_{t_4} \\ \dfrac{C_F(t_4) - C_R(t_4)}{J_P} = \left.\dfrac{d\omega_P}{dt}\right|_{t_4} \end{cases} \quad (39)$$

Assuming that the resistant torque is zero (the hypothesis that $C_R(t)=0$, accepted for the sake of simplicity), and since the clutch torque is constant (in other words, with a zero derivative) as represented in the upper graph of FIG. 4, the following conditions are obtained:

$$\begin{cases} C_M(t_4) = C_{M4} \\ C_F(t_3) = C_F(t_4) = C_{F3} = C_{F4} \\ C_R(t) = 0 \end{cases} \quad (40)$$

By introducing the relation (37) and substituting the conditions (40) in the relation (39), we find the constraint which provides a zero variation of acceleration:

$$\frac{C_{M4}}{J_M + J_P} = \frac{C_{F3}}{J_P} \quad (41)$$

or alternatively $$C_{M4} = C_{F3} \frac{J_M + J_P}{J_P} \quad (41\text{bis})$$

By contrast with the assumptions made in relation (28), it is advantageous to specify the synchronization of the angular velocities of the drive shaft and of the primary gear shaft at the instant $t_4$, i.e.:

$$\omega_P(t_4) = \omega_M(t_4) \quad (42)$$

To check that the synchronization condition has been attained at the instant $t_4$, equations (2) and (3) are integrated between the instants $t_3$ and $t_4$:

$$\begin{cases} \displaystyle\int_{t_3}^{t_4} \frac{d\omega_M}{dt} \cdot J_M \cdot dt = \int_{t_3}^{t_4} (C_M(t) - C_F(t)) \cdot dt \\ \displaystyle\int_{t_3}^{t_4} \frac{d\omega_P}{dt} \cdot J_P \cdot dt = \int_{t_3}^{t_4} (C_F(t) - C_R) \cdot dt \end{cases} \quad (43)$$

Resolving the integral and assuming, as in conditions (40), that $C_{F3}=C_{F4}$, we obtain $$\begin{cases} (\omega_{M4} - \omega_{M3}) \cdot J_M = \dfrac{C_{M4} - C_{M3}}{2} \cdot T_{Cl} + C_{M3} \cdot T_{Cl} - C_{F3} \cdot T_{Cl} \\ (\omega_{P4} - \omega_{P3}) \cdot J_P = C_{F3} \cdot T_{Cl} - C_R \cdot T_{Cl} \end{cases} \quad (44)$$

Assuming, for simplicity, that the resistant torque is zero, we find:

$$\begin{cases} \omega_{M4} - \omega_{M3} = \dfrac{C_{M4} + C_{M3}}{J_M} \cdot \dfrac{T_{Cl}}{2} - \dfrac{C_{F3}}{J_M} \cdot T_{Cl} \\ \omega_{P4} - \omega_{P3} = \dfrac{C_{F3}}{J_P} \cdot T_{Cl} \end{cases} \quad (45)$$

and by imposing the synchronization defined by relation (42) we obtain:

$$\omega_{M3} - \omega_{P3} = -\frac{C_{M4} + C_{M3}}{2} \cdot \frac{T_{Cl}}{2} + C_{F3} \cdot \left(\frac{1}{J_M} + \frac{1}{J_P}\right) \cdot T_{Cl} \quad (46)$$

By specifying the constraint of zero variation of the acceleration (relation (41)) and specifying that $\omega_{M3}-\omega_{P3}=\Delta\omega$, we obtain:

$$\Delta\omega = -\frac{C_{M4} + C_{M3}}{J_M} \cdot \frac{T_{Cl}}{2} + \frac{C_{M4}}{J_M} T_{Cl} \quad (47)$$

and therefore $$\Delta\omega = \frac{C_{M4} - C_{M3}}{2 \cdot J_M} \cdot T_{Cl} \quad (48)$$

Given the constraint at the instant $t_3$ $$C_{M3} = C_{F3} \quad (49)$$

and the constraint of zero variation of acceleration specified by relation (41), relation (48) can be written as $$\Delta\omega = \frac{C_{M4} - \frac{J_P}{J_M + J_P} \cdot C_{M4}}{2 \cdot J_M} \cdot T_{CI} \quad (50)$$

and therefore $$\Delta\omega = \frac{C_{M4}}{2 \cdot (J_M + J_P)} \cdot T_{CI} \quad (51)$$

The time $T_{CI}$ required for synchronization with inertia compensation from a predetermined value of $\Delta\omega$ can therefore be calculated:

$$T_{CI} = \frac{2 \cdot (J_M + J_P) \cdot \Delta\omega}{C_{M4}} \quad (52)$$

The model therefore requires that, in order to obtain inertia compensation, the engine should be operated at the instant $t_3$ with a constant torque derivative for a period equal to the inertia compensation time $T_{CI}$.

Given that $$\frac{dC_M(t)}{dt} = \frac{C_M(t_4) - C_M(t_3)}{T_{CI}} = \frac{C_{M4} - C_{M3}}{T_{CI}} = dC_{MCI} \quad (53)$$

and substituting the value of $T_{CI}$ calculated in (52), we obtain:

$$dC_{MCI} = \frac{C_{M4} - C_{M3}}{2 \cdot (J_M + J_P) \cdot \Delta\omega} \cdot C_{M4} \quad (54)$$

To summarize, the driving-away control system with inertia compensation proposed by the invention, derived from the model described above, generates engine and clutch reference torques as indicated in FIG. 4 and as represented by the following equations:

$$C_M(t) = C_M(t_0) + \int_{t_0}^{t} dC_M dt \quad \text{for } t_0 \leq t \leq t_1 \quad (55)$$
$$C_M(t) = C_M(t_1) \quad \text{for } t_1 < t \leq t_3$$
$$C_M(t) = C_M(t_3) + \int_{t_3}^{t} dC_{MCI} dt \quad \text{for } t_3 < t \leq t_4$$

and $$C_F(t) = C_F(t_0) + \int_{t_0}^{t} dC_F dt \quad \text{for } t_0 \leq t \leq t_2 \quad (56)$$
$$C_F(t) = C_F(t_2) \quad \text{for } t_2 < t \leq t_3$$

The operation of the control system 20 is described below on the basis of the model described above and with reference to the diagram of FIG. 2.

The system 20 acquires signals indicating the driving-away command imparted by the driver through the accelerator pedal, and in particular a first signal indicating the reference value, jerk*, of the derivative of the longitudinal acceleration $$\text{jerk*} = f_{jerk}(Pacc) \quad (57)$$

a second signal indicating the angular velocity of the drive shaft (number of revolutions of the engine) $\omega_{Msp}$ $$\omega_{Msp} = f_{\omega Msp}(Pacc) + \omega_{Msp\,min} \quad (58)$$

and a third signal indicating the value of the driving-away torque $C_{Driver}$ $$C_{Driver} = f_{cdriver}(Pacc) \quad (59)$$

The driving-away torque $C_{Driver}$ is determined by comparison with predetermined relation maps stored in the memory device $M_E$ by the engine control unit $ECU_E$.

The parameters jerk* and $\omega_{Msp}$ can also be determined in the engine control unit $ECU_E$, on the basis of relation models stored in the memory $M_E$, or, in the currently preferred embodiment, can be determined directly in the gearbox control unit $ECU_G$ by a sub-module 22a connected upstream of a calculation sub-module 22b on the basis of predetermined relation models mapped in the memory $M_G$.

With reference to FIG. 4, the value of the steady torque requested by the driver, $C_{Driver}$, is interpreted as the reference steady torque for the engine and the clutch at the end of the driving-away manoeuvre. In order to apply the temporal variation model shown in the figure to the control of the inertia variation compensation, the driving-away control system specifies an intermediate steady torque for the engine and for the clutch, defined as follows:

$$C_{MSteady} = K_{MSteady} \cdot C_{Driver} \quad (60)$$

in which $$K_{MSteady} = \frac{J_P}{J_M + J_P} \quad (61)$$

according to relation (41) above.

The following definitions are also made:

$$C_{FSteady} = C_{Msteady} \text{ for } C_{Driver} > 0 \quad (62)$$

$$C_{FSteady} = 0 \text{ for } C_{Driver} \leq 0 \quad (63)$$

According to relation (14) of the model, the system specifies the derivative of the torque $C_F$ to be transmitted by the clutch as a function of the determined value of jerk*:

$$dC_F K_{Jerk} \cdot \text{jerk*} [Nm/\text{sec}] \quad (64)$$

in which $$K_{Jerk} = \frac{J_P \cdot \tau}{R} \quad (65)$$

The signal indicating the temporal variation of the reference torque $C_{FRif}$ transmittable by the clutch, output from the generator module 22, will be defined as $$C_{FRif}(t) = C_{F0} + dC_F \cdot t \text{ for } t_0 \leq t \leq t_2$$

$$C_{FRif}(t) = C_{FSteady} \text{ for } t_2 < t \leq t_4 \quad (66)$$

where $C_{F0}$ is the initial value of the torque, i.e.

$$C_{F0} = C_F(t_0) \quad (67)$$

The module 22 also generates a signal indicating the variation in time of the requested engine torque, by calculating the value of the derivative of the reference engine torque as a function of the derivative of the clutch torque, and of the signal indicating the angular velocity of the drive shaft during driving away according to relation (25) of the model described above:

$$dC_M = \cfrac{1}{\left(\cfrac{1}{dC_F} - \cfrac{2 \cdot (\omega_{Msp} - \omega_{M0}) \cdot J_M}{(C_{MSteady} - C_{M0})^2}\right)} \quad (68)$$

in which $C_{M0}$ is the initial value of the engine torque, i.e.

$$C_{M0} = C_M(t_0) \quad (69)$$

and $\omega_{M0}$ is the initial value of the rotation speed of the engine, i.e.

$$\omega_{M0} = \omega_M(t_0) \quad (70)$$

The derivative of the engine torque is always greater than the derivative of the clutch torque, i.e.

$$dC_M > dC_F \quad (71)$$

Clearly, the value of $dC_M$ must be limited to the maximum value that can be handled by the engine.

In particular, two different conditions are identified, one for the traction condition (accelerator pedal pressed down) and one for the condition of release of the accelerator pedal, indicated by the following relations:

$$dC_M = \min(dC_{M\ max\_trz}, dC_M) \text{ for } C_{Driver} \geq 0 \quad (72)$$

$$dC_M = dC_{M\ max\_ril} \text{ for } C_{Driver} < 0 \quad (73)$$

In the temporal variation of the engine and clutch torques, at the end of the principal ramps at the instant $t_2$ it is necessary to wait for the instant $t_3$, in other words to wait for the attainment of the condition in which the difference between $\omega_M$ and $\omega_P$ is less than the predetermined threshold $\Delta\omega_{CI}$.

Thus the inertia compensation is controlled by calculating the derivative of the engine torque:

$$dC_{MCI} = \frac{C_{Driver} - C_{MSteady}}{2 \cdot (J_M + J_P) \cdot \Delta\omega_{CI}} \cdot C_{Driver} \quad (74)$$

according to relation (54) of the described model, and obtaining a signal indicating the variation of the reference engine torque, thus:

$$C_{MRif}(t) = C_{M0} + dC_M \cdot t \text{ for } t_0 \leq t \leq t_1$$

$$C_{MRif}(t) = C_{MSteady} \text{ for } t_1 < t \leq t_3 \quad (75)$$

$$C_{MRif}(t) = C_{MSteady} + dC_{MCI} \cdot t \text{ for } t_3 < t \leq t_4$$

The estimator module 24 assumes two different operating conditions, namely a first operating condition with the clutch disengaged in modulation and a second operating condition with the clutch engaged, in other words with the angular velocities of the drive shaft and of the primary gear shaft synchronized.

In the first operating condition, it determines the signals $$\omega_{MRif} = \int \frac{C_{MRif}(t) - C_{FRif}(t)}{J_M} dt \quad (76)$$

and $$\omega_{PRif} = \int \frac{C_{FRif}(t)}{J_P} dt \quad (77)$$

In the second operating condition, it determines the signals $$\omega_{MRif} = \int \frac{C_{MRif}(t)}{J_M + J_P} dt \quad (78)$$

and $$\omega_{PRif} = \omega_{MRif} = \int \frac{C_{MRif}(t)}{J_M + J_P} dt \quad (79)$$

The calculated signals $\omega_{MRif}$ and $\omega_{PRif}$ are then supplied by feedback to the generator module 22 to permit the recognition of the condition of synchronization between $\omega_{MRif}$ and $\omega_{PRif}$ which identifies the change from the operating condition with modulation of the clutch to the engaged clutch condition.

The signals $C_{MRif}$ and $C_{FRif}$ are corrected in real time, by summing the respective corrective contributions $\Delta C_M$ and $\Delta C_F$ calculated by the controller module 26, by comparison with the actual angular velocities of the drive shaft and of the primary gear shaft measured by the on-board sensors.

Clearly, provided that the principle of the invention is retained, the forms of application and the details of construction can be varied widely from what has been described and illustrated purely by way of example and without restrictive intent, without departure from the scope of protection of the present invention as defined by the attached claims.

What is claimed is:

1. Control system for controlling a driving-away manoeuvre in a motor vehicle provided with a gearbox comprising a primary input shaft adapted to be coupled to a drive shaft of a propulsion system of the vehicle by means of a servo-assisted friction clutch, comprising:

an electronic processing assembly adapted to receive at their inputs signals or data indicating a command imparted by the driver of the motor vehicle by the operation of the accelerator pedal, and arranged for generating command signals or data designed to control torque actuator devices of the propulsion system and of the friction clutch, for the control of the driving-away manoeuvre in the motor vehicle; and memory devices, associated with the said processing assembly and storing data and/or instructions representing a mathematical reference model for the calculation of the aforesaid command signals, the processing assembly including:

a reference torque generator module arranged for generating, on the basis of the signals or data indicating the command imparted by the driver by the operation of the accelerator pedal and of the reference model, reference torque request signals or data indicating a reference torque requested from the drive shaft and a reference torque requested from the friction clutch in the course of the driving-away manoeuvre;

an estimator module, arranged for calculating, on the basis of the reference torque request signals or data and on the basis of the reference model, signals or data indicating the angular velocities of the drive shaft and of the gearbox primary input shaft in the course of the driving-away manoeuvre; and a controller module, arranged for calculating, on the basis of the signals or data indicating the angular velocities of the drive shaft and of the primary input shaft calculated by the estimator module, and on the basis of detected signals or data indicating the actual angular velocities of the drive shaft and of the primary input shaft, corrective contributions to the said reference torque request signals or data, whereby the said torque request signals or data, as modified by the corresponding corrective contributions, form the command signals or data for the torque actuator devices.

2. System according to claim 1, in which the said signals or data indicating the command imparted by the driver by the operation of the accelerator pedal include a signal or datum indicating the position of the accelerator pedal.

3. System according to claim 2, in which the said signals or data indicating the command imparted by the driver by the operation of the accelerator pedal include a signal or datum indicating the requested variation of longitudinal acceleration of the vehicle, determined as a function of the signal or datum indicating the position of the accelerator pedal on the basis of a predetermined first relation model.

4. System according to claim 3, in which the said signals or data indicating the command imparted by the driver by the operation of the accelerator pedal include a signal or datum indicating the requested driving-away torque, determined as a function of the signal or datum indicating the position of the accelerator pedal on the basis of a predetermined second relation model.

5. System according to claim 4, in which the said signals or data indicating the command imparted by the driver by the operation of the accelerator pedal include a signal or datum indicating the angular velocity of the drive shaft requested during driving away, determined as a function of the signal or datum indicating the position of the accelerator pedal on the basis of a predetermined third relation model.

6. System according to claim 5, in which the said first relation model associates the signal or datum indicating the position of the accelerator pedal with a signal or datum indicating the variation of longitudinal acceleration of the vehicle which is constant over time at least during a first stage of the driving-away manoeuvre, and the said reference torque request signal indicating the reference torque requested from the friction clutch has a linear temporal variation in the form of a ramp in a first stage of the driving-away manoeuvre, the gradient of which is proportional to the value of the said signal or datum indicating the variation of the longitudinal acceleration.

7. System according to claim 6, in which the said reference torque request signal indicating the reference torque requested from the drive shaft has a linear temporal variation in the form of a ramp in a first stage of the driving-away manoeuvre, the gradient of which is a function of the angular velocity of the drive shaft requested on driving away and of the gradient of the temporal variation ramp of the signal indicating the reference torque requested from the friction clutch, and is greater than the gradient of the temporal variation ramp of the signal indicating the reference torque requested from the friction clutch.

8. System according to claim 7, in which the said reference torque request signals indicating the reference torque requested from the drive shaft and the reference torque requested from the friction clutch have a constant value over time in an intermediate stage of the driving-away manoeuvre, and the said reference torque request signal driving-away manoeuvre indicating the reference torque requested from the driver shaft has a linear temporal variation in the form of a slope in a final stage of the driving-away manoeuvre, from the instant at which the difference between the angular velocities of the drive shaft and of the gearbox primary input shaft calculated by the estimator module is less than a predetermined threshold value.

9. System according to claim 8, in which the reference torque request signal indicating the reference torque requested from the friction clutch has the following temporal variation:

$$C_{FRif}(t)=C_{F0}+dC_F \cdot t \text{ for } t_0 \leq t \leq t_2$$

$$C_{Frif}(t)=C_{FSteady} \text{ for } t_2 < t \leq t_4$$

where $C_{F0}$ is the initial value of the torque, at time $t_0$ $$C_{F0}=C_F(t_0);$$

$dC_F$ is the gradient of the temporal variation ramp, calculated as $$dC_F = K_{Jerk} \cdot jerk^* [Nm/\sec]$$

in which $$K_{Jerk} = \frac{J_P \cdot \tau}{R}$$

where $J_P$ is the total moment of inertia transferred to the primary shaft, $\tau$ is the selected transmission ratio and $R$ is the rolling radius of the wheels; and $C_{FSteady}$ is a value of intermediate steady torque, defined as $$C_{FSteady} = K_{MSteady} \cdot C_{Driver}$$

in which $$K_{MSteady} = \frac{J_P}{J_M + J_P}$$

where $J_M$ is the total moment of inertia of the engine and $C_{Driver}$ is the reference steady torque for the clutch at the end of the driving-away manoeuvre;

and the reference torque request signal indicating the reference torque requested from the drive shaft has the following temporal variation:

$$C_{MRif}(t)=C_{M0}+dC_M \cdot t \text{ for } t_0 \leq t \leq t_1$$

$$C_{MRif}(t)=C_{Msteady} \text{ for } t_1 < t \leq t_3$$

$$C_{Mrif}(t)=C_{Msteady}+dC_{MC1} \cdot t \text{ for } t_3 < t \leq t_4$$

where:

$C_{M0}$ is the initial value of the torque, at time $t_0$ $$C_{M0}=C_M(t_0);$$

$dC_M$ is the gradient of the temporal variation ramp, calculated as $$dC_M = \cfrac{1}{\left(\cfrac{1}{dC_F} - \cfrac{2 \cdot (\omega_{Msp} - \omega_{M0}) \cdot J_M}{(C_{MSteady} - C_{M0})^2}\right)}$$

in which $\omega_{M0}$ is the initial value of the rotation speed of the engine, at time $t_0$ $$\omega_{M0}=\omega_M(t_0), \text{ and}$$

$C_{MSteady}$ is a value of intermediate steady torque, defined as $$C_{MSteady} = K_{MSteady} \cdot C_{Driver}$$

where $$K_{MSteady} = \frac{J_P}{J_M + J_P}$$

and $C_{Driver}$ is the reference steady torque for the engine at the end of the driving-away manoeuvre; and $dC_{MCI}$ is the gradient of the temporal variation ramp in a terminal stage for inertia compensation, defined as:

$$dC_{MC1} = \frac{C_{Driver} - C_{MSteady}}{2 \cdot (J_M + J_P) \cdot \Delta\omega_{C1}} \cdot C_{Driver}$$

in which $\Delta\omega_{CI}$ is a threshold value of difference between the angular velocities of the drive shaft and of the gearbox primary input shaft calculated by the estimator module, the said inertia compensation stage being adapted to ensure the synchronization of the angular velocities of the drive shaft and of the primary input shaft in such a way as to avoid discontinuities in the acceleration of the vehicle due to the variations of the equivalent moment of inertia of the system following the engagement of the friction clutch.

10. System according to any one of the preceding claims, in which the said processing assembly comprises separate control units for the engine and for the gearbox, coupled to corresponding memory devices and connected to a common transmission line, and adapted to be interfaced with corresponding torque actuators of the propulsion system and of the friction clutch, the engine control unit controlling the torque actuator devices of the propulsion system as a function of the torque request signal generated by the gearbox control unit.

11. System according to any one of claims 1 to 9, in which the said processing assembly comprises a single integrated electronic control unit, coupled to a memory device, and adapted to be interfaced with torque actuator devices of the propulsion system and of the friction clutch.

12. Control method for controlling a driving-away manoeuvre in a motor vehicle provided with a gearbox comprising a primary input shaft which can be coupled to a drive shaft of a propulsion system of the vehicle by means of a servo-assisted friction clutch, comprising the following operations:

a) generating, on the basis of signals or data indicating a command imparted by the driver by the operation of the accelerator pedal and on the basis of a mathematical reference model, reference torque request signals or data indicating a reference torque requested from the drive shaft and a reference torque requested from the friction clutch in the course of the driving-away manoeuvre;

b) estimating, on the basis of the reference torque request signals or data and on the basis of the reference model, signals or data indicating the angular velocities of the drive shaft and of the gearbox primary input shaft in the course of the driving-away manoeuvre; and c) determining, on the basis of the signals or data indicating the estimated angular velocities of the drive shaft and of the primary input shaft, and on the basis of detected signals or data indicating the actual angular velocities of the drive shaft and of the primary input shaft, corrective contributions to the said reference torque request signals or data, the said torque request signals or data, as modified by the corresponding corrective contributions, forming command signals or data for the control of torque actuator devices of the propulsion system and of the friction clutch, for the control of the driving-away manoeuvre in the motor vehicle.

13. Method according to claim 12, comprising the detection of a signal or datum indicating the position of the accelerator pedal following the command imparted by the driver by the operation of the accelerator pedal.

14. Method according to claim 13, comprising the determination of a signal or datum indicating the variation of longitudinal acceleration of the vehicle requested by means of the command imparted by the driver, as a function of the signal or datum indicating the position of the accelerator pedal, on the basis of a predetermined first relation model.

15. Method according to claim 14, comprising the determination of a signal or datum indicating the driving-away torque requested by means of the command imparted by the driver, as a function of the signal or datum indicating the position of the accelerator pedal, on the basis of a predetermined second relation model.

16. Method according to claim 15, comprising the determination of a signal or datum indicating the angular velocity of the drive shaft torque requested on driving away, as a function of the signal or datum indicating the position of the accelerator pedal, on the basis of a predetermined third relation model.

17. Method according to claim 16, in which the said first relation model associates the signal or datum indicating the position of the accelerator pedal with a signal or datum element indicating the variation of longitudinal acceleration of the vehicle which is constant over time at least during a first stage of the driving-away manoeuvre, and the reference torque request signal indicating the reference torque requested from the friction clutch has a linear temporal variation in the form of a ramp in a first stage of the driving-away manoeuvre, the gradient of which is proportional to the value of the said signal or datum indicating the variation of the longitudinal acceleration.

18. Method according to claim 17, in which the said reference torque request signal indicating the reference torque requested from the drive shaft has a linear temporal variation in the form of a ramp in a first stage of the driving-away manoeuvre, the gradient of which is a function of the angular velocity of the drive shaft requested on driving away and of the gradient of the temporal variation ramp of the signal indicating the reference torque requested from the friction clutch, and is greater than the gradient of the tern oral variation ram of the signal indicating the reference torque requested from the friction clutch.

19. Method according to claim 18, in which the said reference torque request signals indicating the reference torque requested from the drive shaft and the reference torque requested from the friction clutch have a constant value over time in an intermediate stage of the driving-away manoeuvre, and the said reference torque request signal indicating the reference torque requested from the drive shaft has a linear temporal variation in the form of a ramp in a terminal stage of the driving-away manoeuvre, from the instant at which the difference between the angular velocities of the drive shaft and of the gearbox primary input shaft calculated by the estimator module is less than a predetermined threshold value.

20. Method according to claim 19, in which the reference torque request signal indicating the reference torque requested from the friction clutch has the following temporal variation:

$$C_{Frij}(t) = C_{F0} + dC_F \cdot t \text{ for } t_0 \leq t \leq t_2$$

$$C_{FRij}(t) = C_{Fsteady} \text{ for } t_2 < t \leq t_4$$

where:

$C_{F0}$ is the initial value of the torque, at time $t_0$ $$C_{F0} = C_F(t_0);$$

$dC_F$ is the gradient of the temporal variation ramp, calculated as $$dC_F = K_{Jerk} \cdot jerk^* [Nm/\sec]$$

in which $$K_{Jerk} = \frac{J_P \cdot \tau}{R}$$

where $J_P$ is the total moment of inertia transferred to the primary shaft, $\tau$ is the selected transmission ratio and R is the rolling radius of the wheels; and $C_{FSteady}$ is a value of intermediate steady torque, defined as $$C_{FSteady} = K_{MSteady} \cdot C_{Driver}$$

in which $$K_{MSteady} = \frac{J_P}{J_M + J_P}$$

where $J_M$ is the total moment of inertia of the engine and $C_{Driver}$ is the reference steady torque for the clutch at the end of the driving-away manoeuvre;

and the reference torque request signal indicating the reference torque requested from the drive shaft has the following temporal variation:

$$C_{MRij}(t) = C_{M0} + dC_M \cdot t \text{ for } t_0 \leq t \leq t_1$$

$$C_{MRij}(t) = C_{Msteady} \text{ for } t_1 < t \leq t_3$$

$$C_{MRij}(t) = C_{Msteady} + dC_{MC1} \cdot t \text{ for } t_3 < t \leq t_4$$

where:

$C_{M0}$ is the initial value of the torque, at time $t_0$ $$C_{M0} = C_M(t_0);$$

$dC_M$ is the gradient of the temporal variation ramp, calculated as $$dC_M = \frac{1}{\left( \frac{1}{dC_F} - \frac{2 \cdot (\omega_{Msp} - \omega_{M0}) \cdot J_M}{(C_{MSteady} - C_{M0})^2} \right)}$$

in which $\omega_{M0}$ is the initial value of the rotation speed of the engine, at time $t_0$ $\omega_{M0} = \omega_M(t_0)$, and $C_{MSteady}$ is a value of intermediate steady torque, defined as $$C_{MSteady} = K_{MSteady} \cdot C_{Driver}$$

where $$K_{MSteady} = \frac{J_P}{J_M + J_P}$$

and $C_{Driver}$ is the reference steady torque for the engine at the end of the driving-away manoeuvre; and $dC_{MCI}$ is the gradient of the temporal variation ramp in a terminal stage for inertia compensation, defined as:

$$dC_{MC1} = \frac{C_{Driver} - C_{MSteady}}{2 \cdot (J_M + J_P) \cdot \Delta\omega_{C1}} \cdot C_{Driver}$$

in which $\Delta\omega_{CI}$ is a threshold value of difference between the angular velocities of the drive shaft and of the gearbox primary input shaft calculated by the estimator module, the said inertia compensation stage being adapted to ensure the synchronization of the angular velocities of the drive shaft and of the primary input shaft in such a way as to avoid discontinuities in the acceleration of the vehicle due to the variations of the equivalent moment of inertia of the system following the engagement of the friction clutch.

* * * * *